May 31, 1927. 1,630,897
J. JACQUES ET AL
CLOSURE FOR AUTOMOBILE RADIATORS AND THE LIKE
Original Filed May 3, 1924
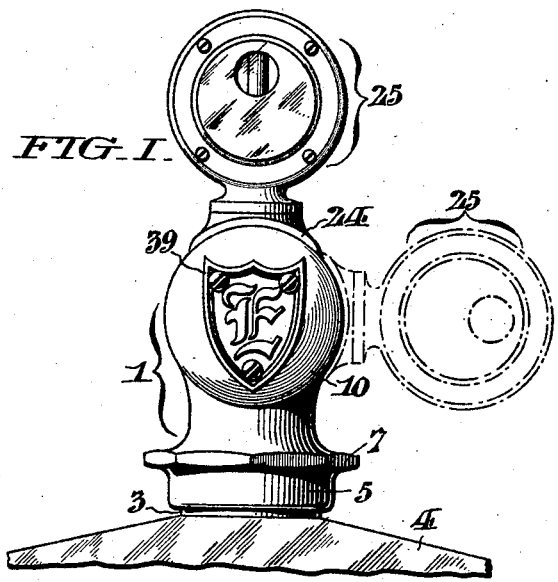
FIG. I.
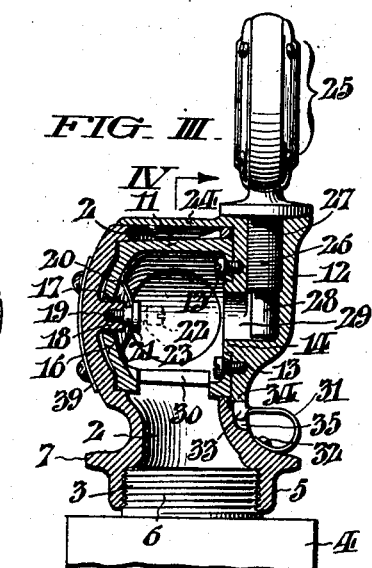
FIG. III.
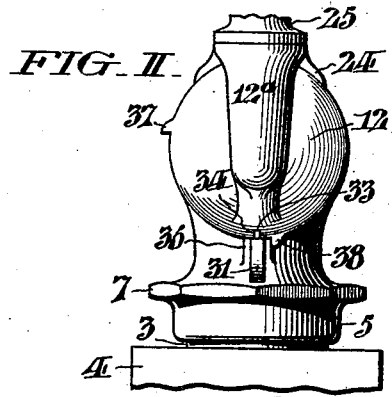
FIG. II.
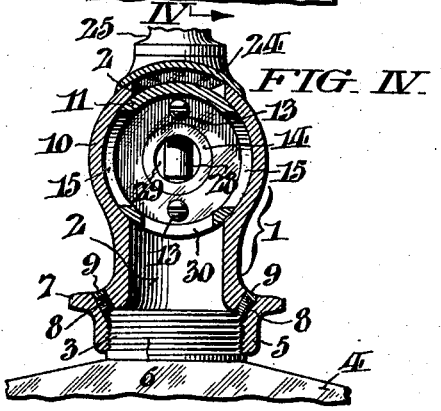
FIG. IV.
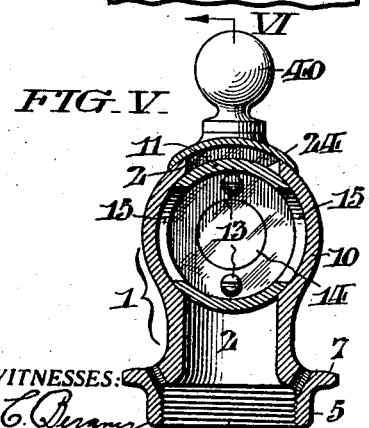
FIG. V.
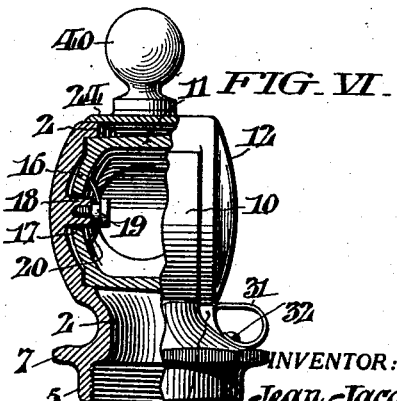
FIG. VI.
WITNESSES:
John C. Bergner
Thomas W. Kerr Jr.
INVENTOR:
Jean Jacques &
Adolph W. Oswald,
BY Fraley Paul
ATTORNEYS.

Patented May 31, 1927.

1,630,897

UNITED STATES PATENT OFFICE.

JEAN JACQUES AND ADOLPH W. OSWALD, OF PHILADELPHIA, PENNSYLVANIA.

CLOSURE FOR AUTOMOBILE RADIATORS AND THE LIKE.

Application filed May 3, 1924, Serial No. 710,725. Renewed March 17, 1926.

Our invention relates to closure means for the inlets of automobile radiators, gasoline tanks, etc. The screw cap ordinarily used as a closure for automobile radiators or gasoline tanks, not only requires considerable time in effecting its attachment and detachment, but is very often dropped, rolling under the machine and rendering its recovery extremely annoying.

The main purpose of our invention is to overcome the objections noted, and, with this end in view, to provide a closure means that may be economically manufactured, which is extremely attractive and ornamental in appearance, capable of being permanently secured to the inlet of a radiator or gasoline tank, and easily and quickly operated to permit access to the inlet for filling without requiring removal or detachment of any of its parts.

Other objects and attendant advantages will become apparent from the detailed description which follows of two alternative embodiments typical of our invention, the appended claims serving to define the features which we believe to be novel and therefore patentable.

In the drawings Fig. I is an illustration showing our improved closure applied to the inlet of an automobile radiator.

Fig. II is a rear view of the same with certain portions broken away.

Fig. III is a vertical sectional elevation taken along a plane at right angles to Fig. I.

Fig. IV is a sectional view taken as indicated by the lines IV—IV in Fig. III.

Fig. V is a sectional view corresponding to Fig. IV, of an alternative form of our invention; and Fig. VI is a sectional view of the same taken as indicated by the lines VI—VI in Fig. V.

Referring first to the form of our invention illustrated in Figs. I—IV inclusive, the same will be observed to comprise a casing 1 with a through passage 2 that extends vertically thereof for direct communication with the inlet 3 of the automobile radiator partly shown at 4. The lower end of the casing 1 is circumferentially enlarged somewhat as at 5, and internally screw-threaded to engage a corresponding thread 6 of the radiator inlet 3, a polygonal band 7 about the base portion serving as an ornamentation as well as a means permitting engagement by a wrench in attaching. As a means to secure the closure device to the radiator inlet 3 with assurance against theft, we may employ set screws 8 in tapped openings through the enlarged base portion 5, said screws being adapted to engage the radiator inlet 3 as best shown in Fig. IV. After these set screws 8 are drawn up, filler plugs 9 are inserted in the open ends of the threaded apertures. While a closure device constructed as explained may be substituted for the ordinary screw cap, it is quite obvious that other methods may be employed for effecting permanent attachment in case of embodiment in a radiator during manufacture initially, as for example by soldering or welding to the inlet 3, or by constructing the casing 1 in integral formation with said inlet. Somewhat above the base portion 5, the casing 1 is bulged to provide a horizontal cylindric shell 10 for housing a hollow plug valve 11 preferably constructed with a separate back piece 12, the two parts being secured together by screws 13. An annular shoulder 14 on the piece 12 engages an axial aperture in the contiguous end wall of the plug valve 11 to determine and maintain the proper relative positions of the two valve parts in a manner obvious from the illustration. The plug valve 11, it will be observed, is conically tapered slightly for fluid-tight fit in the correspondingly configured seat therefor, and has diametrically aligned ports 15, which, when said valve is turned through a quadrant to open position as shown in dot-and-dash lines in Fig. I, register with the through pasage 2 of the casing 1 and thereby establish direct communication with the inlet 3 for filling.

As shown in Fig. III, the end wall 16 of the hollow plug valve 11 opposite that attached to the piece 12 is axially apertured as at 17, to freely center about an integral stud 18 projecting from the base of the valve bore in casing 1. The stud 18 extends sufficiently into the interior of the plug 11 to afford attachment for a suitable retaining means including a screw 19, and a spring disk washer 20 engaged behind a circumferential shoulder 21 of said screw, whereby the plug valve 11 is at the same time held in fluid tight relation to its seat. By virtue of its position within the hollow of the plug valve 11, the means for retaining the same in the assemblage is concealed against observation from the exterior and thus partly protected against the possibility of unauthorized tampering. As a further safe guard to this end, the screw 19 is initially formed with a slotted head 22 shown in dotted lines in Fig. III, and immediately behind the head with a comparatively thin neck 23 which will readily permit the head 22 to be twisted or cut off after the screw is driven home, thereby rendering subsequent removal of the screw 19 very difficult of accomplishment more especially on account of the shallow depth of the shoulder flange 21. Attachment of the screw 19 is easy of accomplishment by access had through the open end of the passage 2 when the ports 15 of the valve plug 11 are brought into registry therewith. An arcuate segmental plate 24 projecting forwardly from the back piece 12 of the plug valve 11 and formed preferably as an integral part of the latter, serves as a cover for the open end of the through passage 2 when the plug valve 11 is in the closed position, see Figs. III and IV. The back piece 12 of the plug valve 11 is, in this instance, bulged somewhat as at 12ª, Fig. II, to facilitate attachment of a standard form of temperature indicating instrument such as comprehensively designated at 25, whose threaded shank 26 is screwed into a tapped opening 27 provided therefor in the bulge 12ª. The lower end of the thermometer 28 of the temperature indicating instrument 25 is exposed in a passage 29 that communicates laterally with the hollow interior of the plug valve 11, which interior is open to the radiator inlet 3 through a port 30 intermediate the ports 15 when said plug valve is in closed position. By this arrangement, the thermometer 28 is at all times directly subject to temperature conditions existing in the radiator 4. As a consequence of its direct attachment to the plug valve 11, the temperature indicating instrument 25 may be conveniently employed as a shifting handle.

In order to lock the plug valve 11 in closed position against displacement through jarring or otherwise, we employ a spring latch 31 bent to the rounded configuration shown in Fig. III from narrow strip metal, and anchored by a screw 32 to the top face of the polygonal portion 7 at the rear of the closure device 1. The outer or free end of the catch 31 is twisted at right angles to its major portion as indicated at 33 to engage a narrow peripheral notch 34 of the piece 12 and thus to hold the plug valve 11 normally locked. Depression of the catch 31 allowed by virtue of the clearance recess 35 in a lug 36 of the casing 1, results in release of the plug valve 11 for free rotation in opening the same. The rotative movement of the plug valve 11 is limited by angularly spaced stop projections 37, 38 on the back piece 12 that alternately engage the casing lug 36 and thereby respectively determine the open and closed positions. During closing of the plug valve 11, the end 33 of the catch 31 merely rides on the periphery of the back piece 12 until it automatically slips into the notch 34 under the spring action when the stop projection 38 engages the lug 36 as shown in Fig. II.

If desired, the front of the valve shell portion 10 of the casing 1 may be spherically rounded as shown for better ornamental effect, and employed for attachment of an escutcheon 39, Figs. I and II, or any other characterizing or identifying symbol or device.

The alternative form of our invention, Figs. IV and V, is in general similar to the first described embodiment, and the same reference numerals are therefore employed to designate those parts which are identical. The main differences to be pointed out are the omission of provisions for attaching the temperature recording device 25, and the use of a knob 40 in lieu thereof to serve as an operating handle, said knob being attached centrally of the segmental plate projection 24 of the plug 11 that covers the open end of the through passage 2 in the casing 1. The alternative form of our invention, as will be readily appreciated, while particularly adapted as a closure for gasoline tanks or the like, as well as in the connection described of the first form when a temperature indicating device is not desired or deemed essential.

Having thus described our invention, we claim:

1. A closure for the inlet of an automobile radiator, gasoline tank or the like, affording a through passage, a plug valve interposed cross-wise of said passage, a back piece on the plug valve and a plate member formed with said back piece for externally covering the passage when the valve is closed.

2. A closure for the inlet of an automobile radiator gasoline tank or the like, affording a through passage, a plug valve interposed cross-wise of said passage to control the inlet, an attached back piece for the valve having an integral apron section adapted to exteriorly close the through passage, and spring means concealed in the interior of the device for retaining the plug valve in the assemblage.

3. A closure for the inlet of an automobile radiator, gasoline tank or the like, affording a through passage, a hollow plug valve interposed cross-wise of said passage to control the inlet, and a spring disk washer supported within the hollow of the plug valve to retain said valve in the assemblage with fluid tight relation to its seat.

4. A closure for the inlet of an automobile radiator, gasoline tank or the like, affording a through passage, a hollow plug valve interposed cross-wise of said passage to control the inlet, a stud projecting axially from the base of the valve bore through an aperture in the contiguous end wall of the plug valve into the hollow of the latter, and an associated spring disk washer for retaining the respective parts in assemblage.

5. A closure for the inlet of an automobile radiator, gasoline tank or the like, affording a through passage, a hollow conical plug valve interposed cross-wise of said passage to control the inlet, a stud projecting axially from the base of the valve bore and through an aperture in the contigous end wall of the valve into the hollow of the latter, a retaining means secured to the protruding end of the stud, and spring means interposed beneath the retaining means to maintain the valve in fluid-tight relation to its seat.

6. A closure for the inlet of an automobile radiator, gasoline tank or the like, affording a through passage, a hollow plug valve with diametrically opposite ports to register with the through passage when the valve is in open position and a third port intermediate the other two to establish communication between the radiator and the hollow of the valve when the latter is in closed position, and provisions on the valve for attachment of a thermometer-temperature indicating instrument with the bulb end of the thermometer exposed within the hollow interior of the valve.

7. A closure for the inlet of automobile radiators, gasoline tank or the like, affording a through passage, a plug valve crosswise in said passage to control the inlet, a back piece attached to the plug valve having an integral inlet-closure portion and releasable means to lock the plug valve in closed position including a spring latch secured to the valve casing and engaging a notch in the plug valve.

8. A closure for the inlet of an automobile radiator, gasoline tank or the like, affording a through passage, a plug valve interposed crosswise in said passage to control the inlet, a back piece attached to the plug valve having an integral inlet-closure portion, a spring latch to lock the plug valve in closed position, and means for limiting the rotative movement of the valve.

9. A closure for the inlet of automobile radiators, gasoline tank or the like, affording a through passage, a plug valve in said passage to control the inlet, releasable means to lock the plug valve in closed position including a spring latch secured to the valve casing and engaging a notch of the valve, and angularly spaced projections on the valve to engage a lug on the valve casing to determine the open and closed positions of said valve.

10. A closure for the inlet of an automobile radiator, gasoline tank or the like, affording a filling opening and through passage, a hollow plug valve crosswise of said passage to control the inlet, and an apron plate cooperative with a portion of the plug valve to exteriorly and interiorly close the filler opening of the closure when said valve is shut.

In testimony whereof, we have hereunto signed our names at Philadelphia, Pennsylvania, this 21st day of April, 1924.

JEAN JACQUES.
ADOLPH W. OSWALD.